Figure 1:
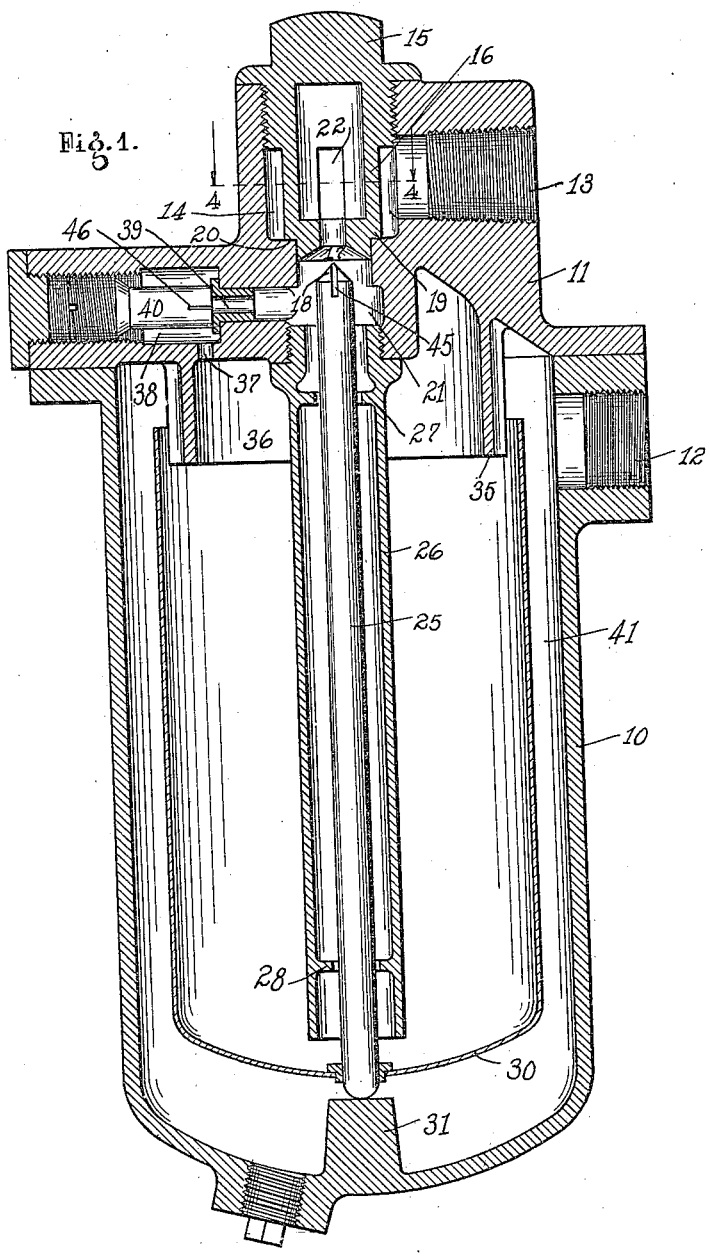

C. STICKLE.
STEAM TRAP.
APPLICATION FILED OCT. 6, 1913.

1,143,329.

Patented June 15, 1915.
2 SHEETS—SHEET 1.

WITNESSES:
A. H. Edgerton
O. M. McLaughlin

INVENTOR.
Cole Stickle
BY
ATTORNEY.

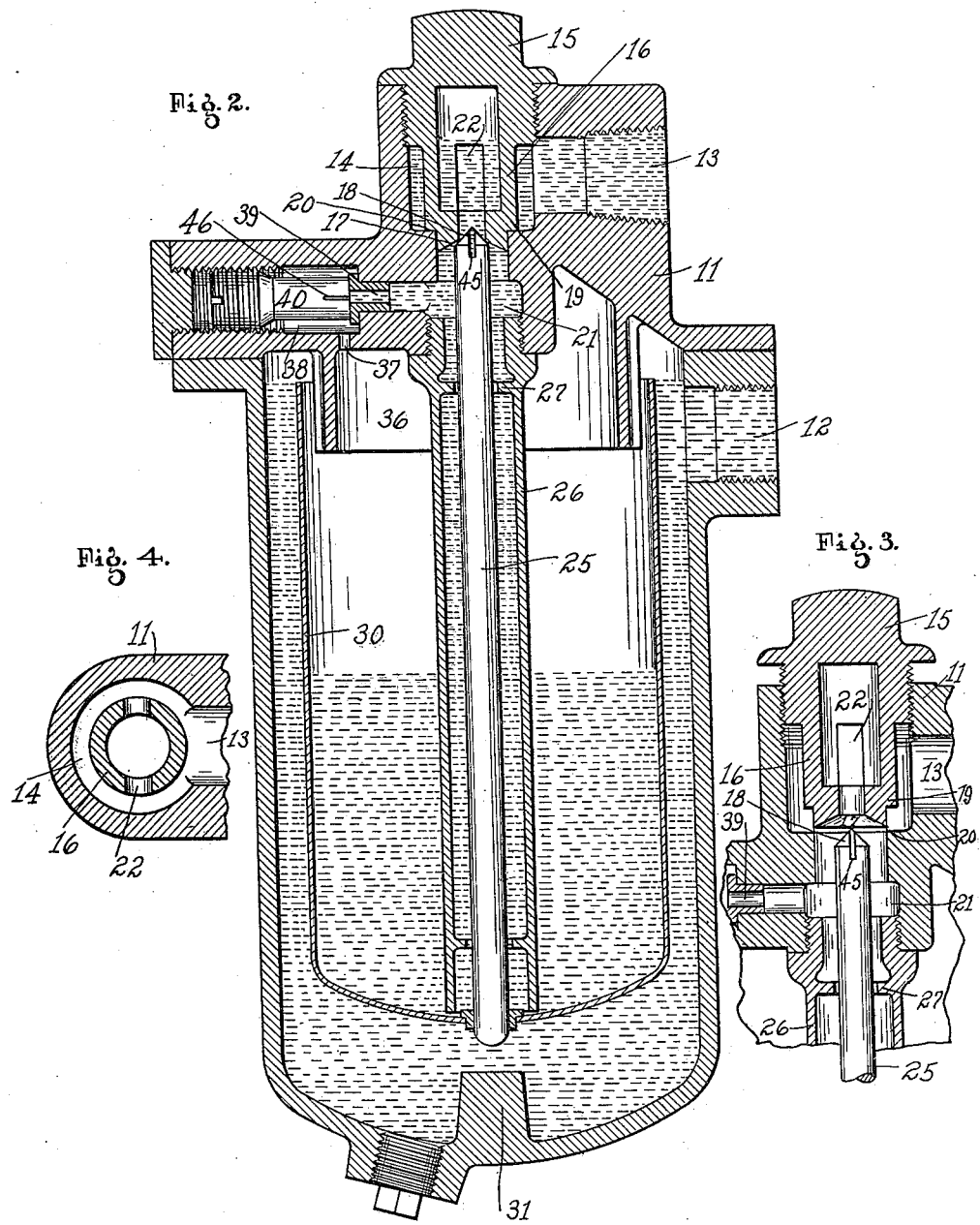

UNITED STATES PATENT OFFICE.

COLE STICKLE, OF INDIANAPOLIS, INDIANA.

STEAM-TRAP.

1,143,329.

Specification of Letters Patent. Patented June 15, 1915.

Application filed October 6, 1913. Serial No. 793,683.

*To all whom it may concern:*

Be it known that I, COLE STICKLE, a citizen of the United States, and a resident of Indianapolis, county of Marion and State of Indiana, have invented a certain new and useful Steam-Trap; and I do hereby declare that the following is a full, clear, and exact description thereof, reference being had to the accompanying drawings, in which like letters refer to like parts.

The object of this invention is to improve the construction and operation of vacuum valve mechanisms for steam heaters, radiators and the like, of the type shown in my former Patent No. 1,015,596 dated Jan. 23, 1912.

The purpose of the improvement is to effectively seal or prevent the steam from entering the vacuum line and thus destroy the vacuum. This object is accomplished by providing the end of the main or air valve on a higher level than the steam and air by-pass and by forming a larger constant outlet in the main or air valve than in the said by-pass. Therefore, when the device is put in use, as soon as the air escapes from the top of the trap, water will rise in the chamber to a higher level than the by-pass and the port therein will thus become water sealed and prevent thereafter the escape of any steam from the upper part of the device but will permit the escape of air.

Another feature of the invention consists in mounting the seat for the main or air valve vertically adjustable so that it may be quickly opened and furnish a by-pass for cleaning out the device when it is clogged with dirt.

The full nature of the invention will be understood from the accompanying drawings and the following description and claim.

In the drawings, Figure 1 is a central vertical section through the device in idle condition. Fig. 2 is the same in operative condition. Fig. 3 is a part of Fig. 1 showing the parts in position for unclogging the device. Fig. 4 is a section on the line 4—4 of Fig. 1.

There is shown in the drawings a cup shaped vessel or casing 10 with a top plate 11 secured thereon. The inlet port 12 enters the main casing 10 while the outlet 13 leads to the vacuum line. The top plate has in it a chamber 14 which is in communication with the outlet 13 and in the upper end of it a nut 15 screws for closing the same and also for supporting the cage 16, the lower end 17 of which, is a seat for the main valve 18. The lower part of the cage 16 has an annular shoulder at 19 which rests upon the annular bottom 20 of the chamber 14 so that when the cage 16 is down and seated, there will be no connection between the chamber 14 and the chamber 21 below the valve seat 17, excepting through the central opening 22 in the cage. The cage 16 is thus seated normally but if the device should become clogged, the nut 15 is slightly unscrewed so as to lift the cage 16 off its seat 20 and thus form a by-pass from the chamber 21 to the chamber 14 whereby the dirt can be cleaned out of the device.

The main valve 18 is the tapering upper end of a rod 25 which projects in a tube 26 and is guided by bars 27 and 28 near the ends of said tube 26. The rod 25 projects below the tube 26 and at its lower end is secured to the bottom of the float 30 which is the shape of a bucket and located within the casing 10. In the bottom of the casing 10 there is an upwardly extending lug 31 for supporting the rod 25 and float when they are in their lowered position.

The upper end of the float loosely surrounds and is guided by a central flange 35 extending down from the top plate 11 and concentric to the tube 26 and rod 25. Therefore, there is a chamber 36 in the upper part of the device and within the flange 35. From the top of that chamber 36 a port 37 leads to the chamber 38 from which the passageway 39 leads to the chamber 21 in the top plate 11. In chamber 38 there is a screw plug 40 which constantly closes communication between chamber 38 and passage 39 excepting through the reduced slot or groove 46 in said plug. Hence, a by-pass is formed from chamber 36 through 37, 38, 46 and 39 to chamber 21 and said by-pass has the reduced portion 46. In valve 18 there is a groove 45 which is larger than the groove 46 or the reduced portion of said by-pass. This maintains the water column up to the valve seat 17. There is also a chamber 41 surrounding the float 30.

The operation of the device is as follows: assuming the parts to be idle as shown in Fig. 1 and the condensation water to enter through the port 12 it will first fill the chamber 41, then the float 30 will rise and the valve 18 will close and thereafter the water will flow into the float 30. While the chamber 41 is filling the air will pass out through the cage 16 because its port is open and then the air from the float 30 and chamber 36 will pass out through said by-pass, that is the port 37 groove 46 and passage 39 and through the chamber 21 and the cage 16. After the valve 18 has been elevated with the float, the air will pass out through the groove 45. As the water enters the float 30 it will rise in the tube 26 and air from that tube will pass out through groove 45. As the air passes out from the tube 26 and chamber 21 they will float with the water and when all the air is out of said chamber 21 and tube 26 the water will stand up to the valve 17 and will close, or water seal, the groove 46 so that no steam can escape through said port but air can escape therethrough. Therefore, there is no chance for steam to escape into the vacuum line but there is every possible opportunity for the air to escape in the vacuum line. After the device is under full operation no steam can escape through the grooves 45 and 46, but air can escape. The reason for this mode of operation is because the large size of the groove 45 and the valve opening 17 as compared with the groove 46 and associated valve opening, will enable the water and air, if any, in chamber 21 to escape so as to maintain a current up through tube 26 and thus maintain a solid column in the tube 26 and chamber 21. If the groove 46 were as large or larger than the groove 45, the pressure in the two chambers 21 and 46 would be equalized so that there would not be a solid water column in tube 26 and chamber 21, but the water therein would drop to the level of the water in the float 30.

The column of water rises in the tube 26 and chamber 21 by reason of the relation between the main valve 18 and the valve 40 and the grooves in them, the main valve being above the valve 40 and the groove in the main valve being larger than that in the valve 40. Said device will operate successfully and automatically in spite of the wide variation of pressure in the apparatus.

I claim as my invention:

A vacuum valve mechanism for steam heaters and the like including a condensation chamber; an open top bucket float therein, a conduit extending from the lower part of said float and through the top of said chamber and having a port at its upper end, a main valve connected with the float for controlling the outlet from the port in the said conduit having a groove in it so it can not absolutely close the outlet port from the said conduit, there being a passageway leading from the top of said condensation chamber and to said conduit at a point below said main valve, and having a reduced portion smaller than the groove in said main valve.

In witness whereof I have hereunto affixed my signature in the presence of the witnesses herein named.

COLE STICKLE.

Witnesses:
J. H. WELLS,
O. N. McLAUGHLIN.

Copies of this patent may be obtained for five cents each, by addressing the "Commissioner of Patents, Washington, D. C."